(12) United States Patent
Sarradin et al.

(10) Patent No.: US 9,420,076 B2
(45) Date of Patent: Aug. 16, 2016

(54) SUPPORT DEVICE FOR AT LEAST ONE COMMUNICATIONS MODULE

(71) Applicant: Compagnie Industrielle et Financiere d'Ingenierie "Ingenico", Paris (FR)

(72) Inventors: Jean-Louis Sarradin, Etables (FR); Dominique Cazou, Saint Jean D'Illac (FR); Renan Bodin, Lyons (FR); Regis Baptiste, Chatte (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/439,997

(22) PCT Filed: Oct. 24, 2013

(86) PCT No.: PCT/EP2013/072334
§ 371 (c)(1),
(2) Date: Apr. 30, 2015

(87) PCT Pub. No.: WO2014/067854
PCT Pub. Date: May 8, 2014

(65) Prior Publication Data
US 2015/0288789 A1     Oct. 8, 2015

(30) Foreign Application Priority Data
Oct. 31, 2012 (FR) .................................... 12 60440

(51) Int. Cl.
*H04B 1/38* (2015.01)
*H04M 1/21* (2006.01)
*G06K 7/00* (2006.01)
*G06K 7/01* (2006.01)

(52) U.S. Cl.
CPC ............. *H04M 1/21* (2013.01); *G06K 7/0008* (2013.01); *G06K 7/01* (2013.01)

(58) Field of Classification Search
CPC ..... H04W 88/02; H04M 1/0214; H04M 1/72529
USPC .................................. 455/557, 550.1, 575.1
See application file for complete search history.

(56) References Cited

U.S. PATENT DOCUMENTS

| 6,164,531 A | 12/2000 | Harris et al. | |
| 7,725,141 B2 * | 5/2010 | Su | H04B 1/088 455/566 |
| 2004/0132507 A1 * | 7/2004 | Shibuya | H04M 1/0214 455/575.1 |

(Continued)

FOREIGN PATENT DOCUMENTS

| EP | 2360987 A1 | 8/2011 |
| FR | 2914800 A1 | 10/2008 |
| WO | 2012129193 A1 | 9/2012 |

OTHER PUBLICATIONS

International Search Report and Written Opinion dated Jan. 9, 2014 for corresponding International Application No. PCT/EP2013/072334, filed Oct. 24, 2013.

(Continued)

*Primary Examiner* — Danh Le
(74) *Attorney, Agent, or Firm* — David D. Brush; Westman, Champlin & Koehler, P.A.

(57) ABSTRACT

A support device is provided for at least one communication module. The support device includes: a holder, which holds, in a removable manner, the communication module to communicate with a communication terminal; and a fixture, which fixes, in a repositionable manner, the support device to the communication terminal.

7 Claims, 9 Drawing Sheets

(56) References Cited

U.S. PATENT DOCUMENTS

| | | | |
|---|---|---|---|
| 2005/0236869 A1* | 10/2005 | Ka | G06F 1/1616 296/192 |
| 2006/0159507 A1* | 7/2006 | Jawerth | G06F 1/162 400/472 |
| 2008/0245851 A1 | 10/2008 | Kowalski | |
| 2012/0137024 A1* | 5/2012 | Kim | G06F 1/1632 710/8 |
| 2012/0256732 A1 | 10/2012 | McAllister | |
| 2012/0282980 A1* | 11/2012 | Freund | H04M 1/0216 455/566 |

OTHER PUBLICATIONS

Machine translation of the Written Opinion dated Jan. 9, 2014 for corresponding International Application No. PCT/EP2013/072334, filed Oct. 24, 2013.

* cited by examiner

SUPPORT DEVICE FOR AT LEAST ONE COMMUNICATIONS MODULE

1. CROSS-REFERENCE TO RELATED APPLICATIONS

This application is a Section 371 National Stage application of International Application No. PCT/EP2013/072334, filed Oct. 24, 2013, the content of which is incorporated herein by reference in its entirety, and published as WO 2014/067854 on May 8, 2014, not in English.

2. FIELD OF THE INVENTION

The field of the invention is that of communications modules and more particularly card reader modules (contactless cards, smartcards or again magnetic smartcards, etc) intended for electrical and mechanical connection to a communications terminal, for example a smartphone or a tablet.

3. PRIOR ART

Figure 1A:
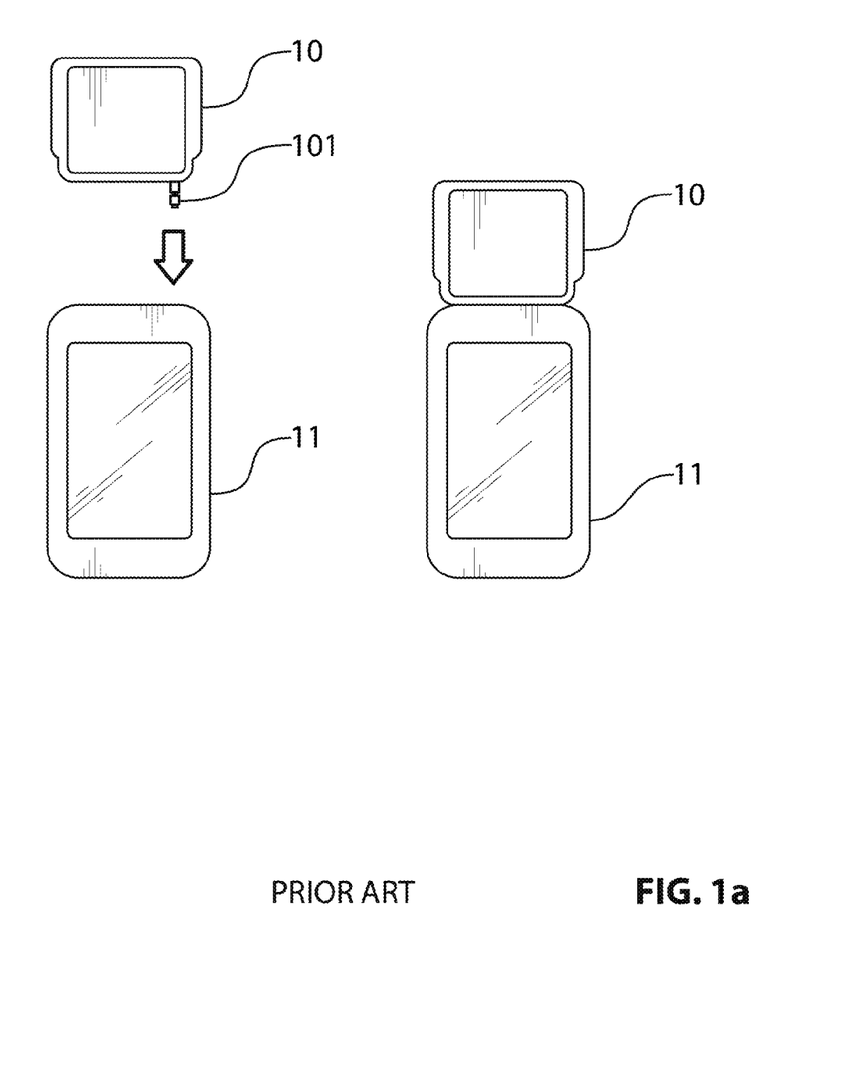
FIGS. 1*a* to 1*c*, already described with reference to the prior art, present examples of mechanical linking of a reader module with a communications terminal according to techniques of the prior art.
Figure 1B:
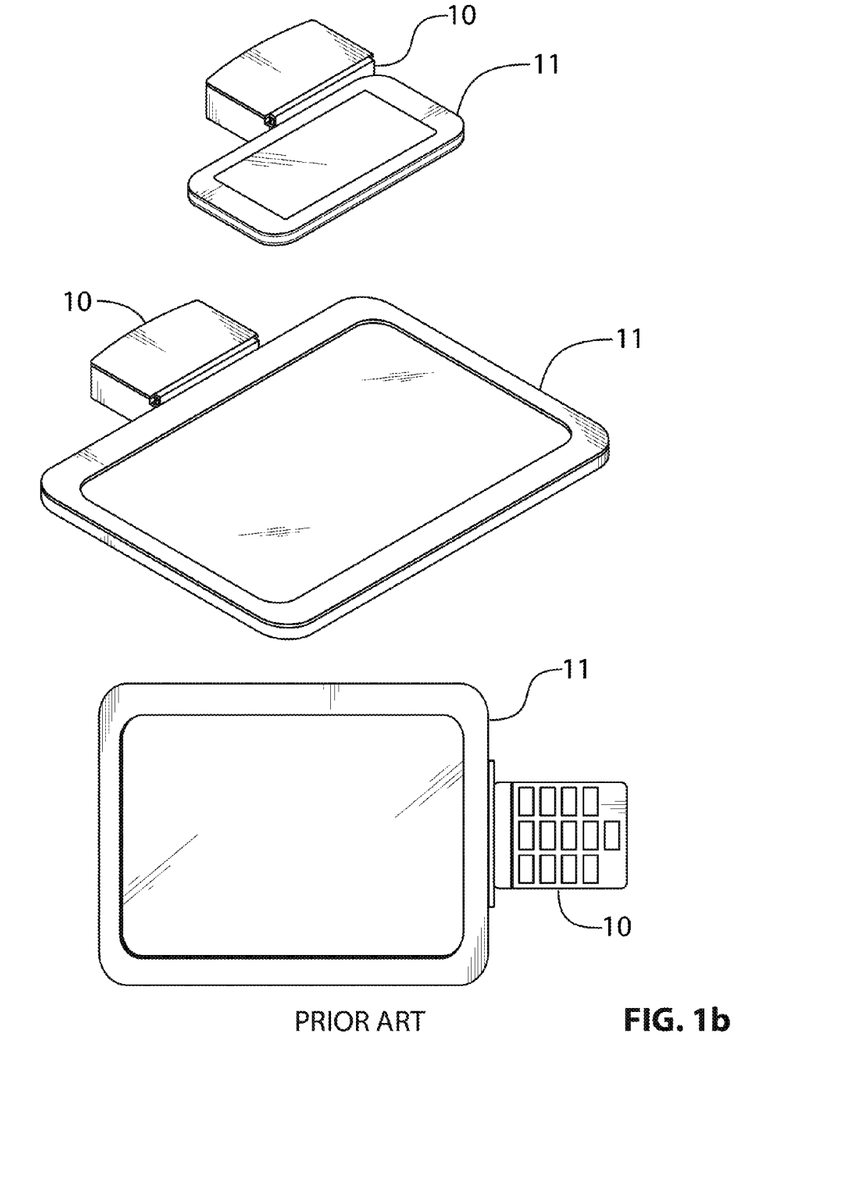

To date, there are such card reader modules 10 electrically and mechanically connected to the communications terminal 11 via the audio jack connector 101, as illustrated in FIGS. 1a and 1b.

In such articles, the audio jack connector 101 therefore fulfils the two functions of electrical connection and mechanical fastening.

The drawbacks of such products are:
firstly, the fragility of the mechanical fastening since the audio jack connector shows no great resistance to the stresses exerted for example on the reader module,
secondly, a high constraint related to the ergonomic characteristics of the module and the communications terminal, because the positioning of the module is imposed by the location of the audio jack on the terminal (up, down, on the side, as illustrated in FIG. 1b).

Figure 1C:
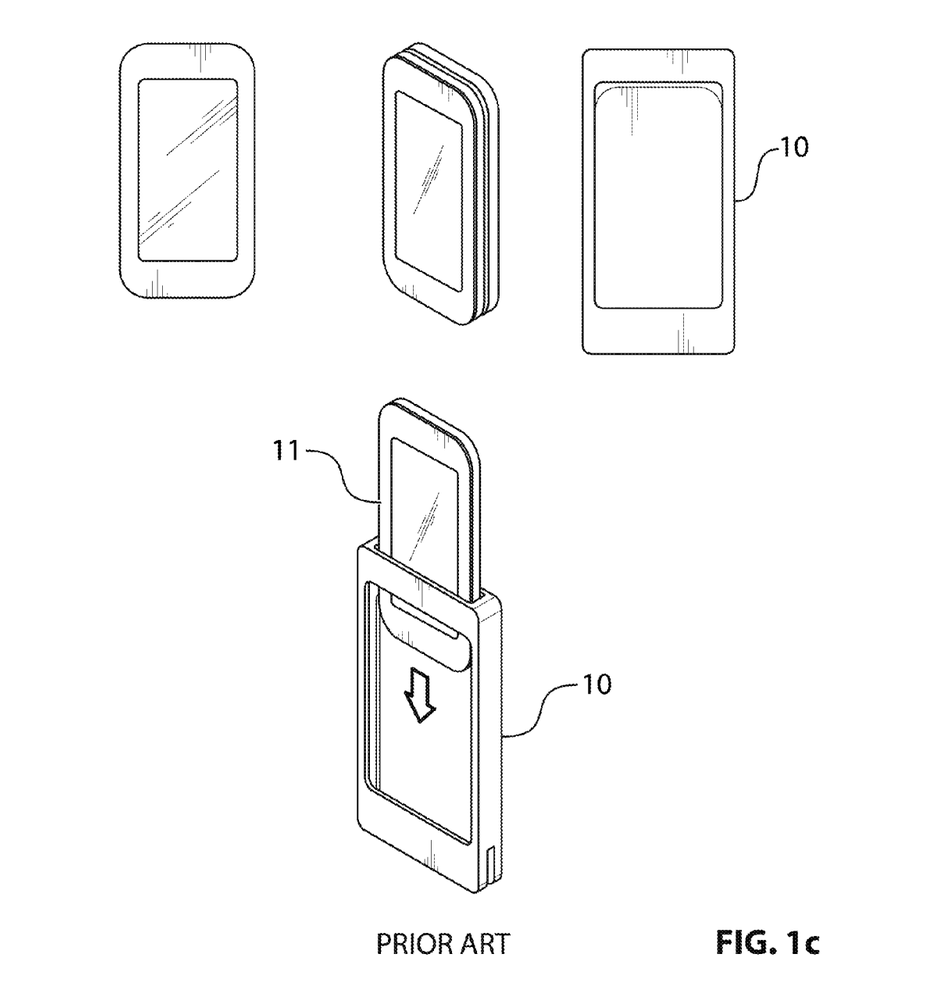

There is also another type of reader module illustrated in FIG. 1c having a specific mechanical location to receive the communications terminal 11 to which it is connected.

The main drawback of such an article is that it is mechanically compatible with only one type of communications terminal and it is therefore necessary to have articles adapted to each type of terminal.

4. SUMMARY OF THE INVENTION

The invention pertains to a device for supporting at least one communications module according to claim 1.

In particular, the device for supporting comprises:
means for detachably holding the communications module, intended for communications with a communications terminal, to the device for supporting;
means for the repositionable fastening of the device for supporting to the communications terminal.

Thus, the invention relies on a novel and inventive approach to the mechanical fastening of a communications module, for example a card reader module (here below denoted as a reader module) to a communications terminal with which it communicates. This not only enables an efficient fastening of the reader module to the communications terminal but also optimizes the ergonomic aspect. In addition, the invention in its different embodiments enables the mechanical connection of a reader module to any type of communications terminal whatsoever.

Thus, the invention, according to different particular embodiments, implements a device for supporting (or support device) that can be used to detachably hold the reader module and, at the same time, fasten the reader module to the communications terminal in a repositionable way.

To this end, the device for supporting has means to hold the reader module, for example in the form of a guideway into which the reader module can be inserted and, at the same time, means to fasten the device for supporting to the communications terminal, for example in the form of means enabling repositionable fastening (by adhesive gel for example).

Thus, unlike in the techniques of the prior art, the reader module can be detached from the device for supporting which itself can be positioned numerous times on any type of communications terminal whatsoever.

According to one particular aspect of the invention, the fastening means are implemented by adhesive gel on at least one portion of one face of the device for supporting.

Thus, according to this particular embodiment of the invention, adhesive gel is used to form the means for fastening the device for supporting to the communications terminal, thus making skillful use of the properties of the adhesive gel which enable efficient fastening as well as repeated use.

In this way, to fixedly attach the device for supporting and the communications terminal together, it is enough to press the device for supporting onto the communications terminal as would be done with a suction cup device. To detach the two elements from each another, it is enough to pull the device for supporting away in the reverse sense.

The adhesive gel used enables repeated use, allowing for example a user to place the reader module, via the device for supporting, on the product when he needs to read a card and to remove it when he no longer has use for it.

Thus, the reader module can be mechanically associated, via the device for supporting, to different articles and, at the same time, the position of the reader module relative to the article with which it is associated can be chosen so as to optimize the ergonomy of the entire unit.

For example, adhesive gel is positioned on one face of the device for supporting in the form of one or more "points" of adhesive gel depending on the shape of the device for supporting for example.

Finally, the adhesive gel has the particular feature, when it is fouled and when its adhesiveness is diminished, of recovering its adhesive power after being cleansed with water. This therefore enables intensive and repeated constraint-free use.

According to one particular characteristic of the invention, the device for supporting is composed of at least two hinged parts, at least one of the hinged parts having fastening means enabling the device for supporting to take at least the following positions:
a fastening position in which the two hinged parts are capable of fastening the device for supporting to the communications terminal;
a position of non-use in which the two hinged parts are folded, one on the other;
a position of presentation of the communications module in which the two hinged parts form an acute angle.

Thus, according to this particular embodiment of the invention, the device for supporting is composed of two hinged parts by which the support part can be folded in order to be put away. This optimizes both the amount of space occupied and the use of the device for supporting to store/present the reader module, for example on a desk.

For example, according to this embodiment, the two hinged parts of the device for supporting can be folded, one on the other (as in a powder box) thus enabling the reader module to be placed in a pocket without the adhesive gel, with which at least one of the two hinged parts is provided, coming into contact with another material.

In addition, when these two parts are "aligned", they form a plane fastening face for fastening the device for supporting, enabling it to be fastened to the communications terminal. If both parts have fastening means, for example in the form of adhesive gel, the fastening of the device for supporting to the terminal is also reinforced by means of these two parts.

Besides, in this fastening position, this embodiment of the invention makes advantageous use of the hinging between the two parts to enable the reader module to be fastened to a communications terminal that does not have a plane surface, such as for example the rear surface of a tablet. In this case, the two parts are not quite aligned and their hinging makes it possible to adapt to the shape of the communications terminal.

Finally, the hinging of these two parts of the device for supporting, as well as the presence of the fastening means on the "lower" part also enable the use of the support in a particular position to store/position the reader module, for example on a merchant's counter or on a desk so as to enable speedy access thereto. Thus, the lower part is fixed to the desk, for example through adhesive gel, while the upper part can have means for holding the reader module.

Thus, if the reader module communicates by a wireless link with the communications terminal, the reader module can be used in this position of presentation by a merchant for example.

According to one particular embodiment, the hinged parts each have fastening means that are disposed in a staggered arrangement so as not to come into contact in the position of non-use.

Thus, according to this particular embodiment of the invention, the two hinged parts of the device for supporting are provided with fastening means, for example in the form of adhesive gel, which is judiciously positioned on each of the two parts so as not to come into contact when the two parts are folded one on the other.

For example, a spot of adhesive gel is positioned in the middle of one of the parts while, on the other part, two spots of adhesive gel are positioned on the sides.

In addition, it is possible, on each of the two hinged parts and facing the different respective points of adhesive gel (when the two parts are folded, one on the other) to provide for hollows that have the approximate thickness of the adhesive gel and thus enable a more efficient "closing" of the device for supporting and a gain in space when it is folded.

According to one particular aspect of the invention, the means for holding the communications module have a guideway shape enabling the insertion or withdrawal of the communications module from the device for supporting by the sliding of the module relative to the device for supporting.

Thus, according to this particular embodiment of the invention, the device for supporting has a guideway in which a part of the reader module can be inserted, in order to make sure that it can be efficiently held while at the same time also enabling the withdrawal of the reader module, for example for putting away the device for supporting when the reader module is not used, or also when the reader module or the device for supporting has to be replaced.

In this way, an autonomous use of the reader module is possible.

According to one particular characteristic of the invention, the means for holding the communications module are made in the same shape as the means for fastening the device for supporting.

Thus, according to this particular embodiment of the invention, the reader module is held on the device for supporting by the same fastening means as those used to fasten the device for supporting to the communications terminal, for example adhesive gel.

Thus, according to a first variant, the device for supporting can present at least two spots of adhesive gel on each of these faces, one spot to hold the reader module and the other to fasten the device for supporting to the communications device.

According to a second variant, the device for supporting can have two distinct parts respectively used to hold the reader module by one or more spots of adhesive gel to this first part and to fasten the device for supporting to the communications terminal also by one or more spots of adhesive gel to this second part.

5. LIST OF FIGURES

Other features and advantages of the invention shall appear more clearly from the following description of a particular embodiment, given by way of a simple illustrative and non-exhaustive example, and from the appended drawings, of which.

6. DESCRIPTION OF ONE EMBODIMENT OF THE INVENTION

6.1 General Principle

The general principle of the invention relies on the use of a support device providing both means for holding a card reader module detachably and means for fastening to a communications terminal that is to communicate with the reader module, thus enabling a "universal" mechanical fastening of a reader module to a communications terminal, whatever the type of terminal (smartphone, tablet, etc).

Besides, the means for holding the reader module make it possible for the reader module to be removed for any independent use and the means for fastening are designed to enable repeated use of the support device through the use of repositionable means while ensuring efficient fastening for optimal use of the unit formed by the reader module and the communications terminal.

6.2 First Embodiment

According to a first particular embodiment of the invention, illustrated especially in FIGS. 2 to 5, the holding means 201 for holding the reader module 10 and the fastening means 202 for fastening this support device 20 to the communications terminal are distinct means.

Figure 2A:
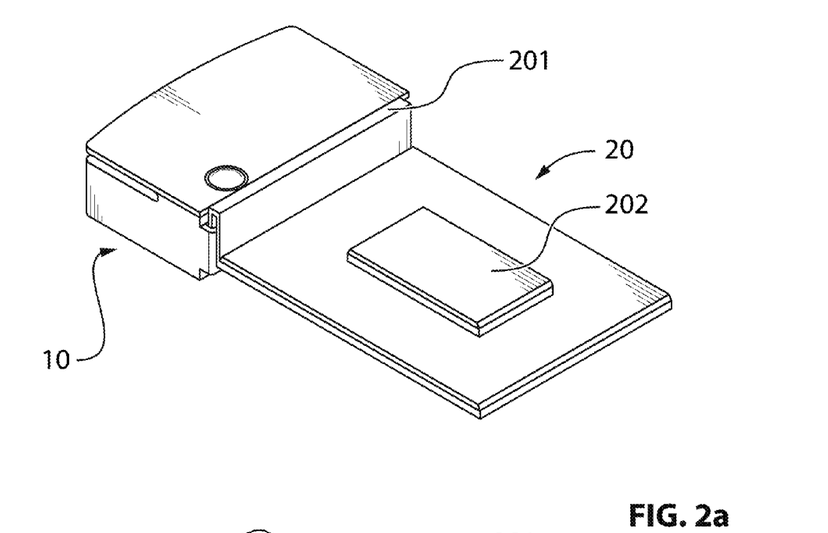
FIGS. 2*a* and 2*b* present two examples of a device for supporting (or support device) according to two particular embodiments of the invention.

Thus, according to a first variant illustrated in FIG. 2a, the support device 20 comprises a part carrying fastening means 202 for fastening this support device to the communications terminal and a part forming the means 201 for holding the reader module.

Figure 5:
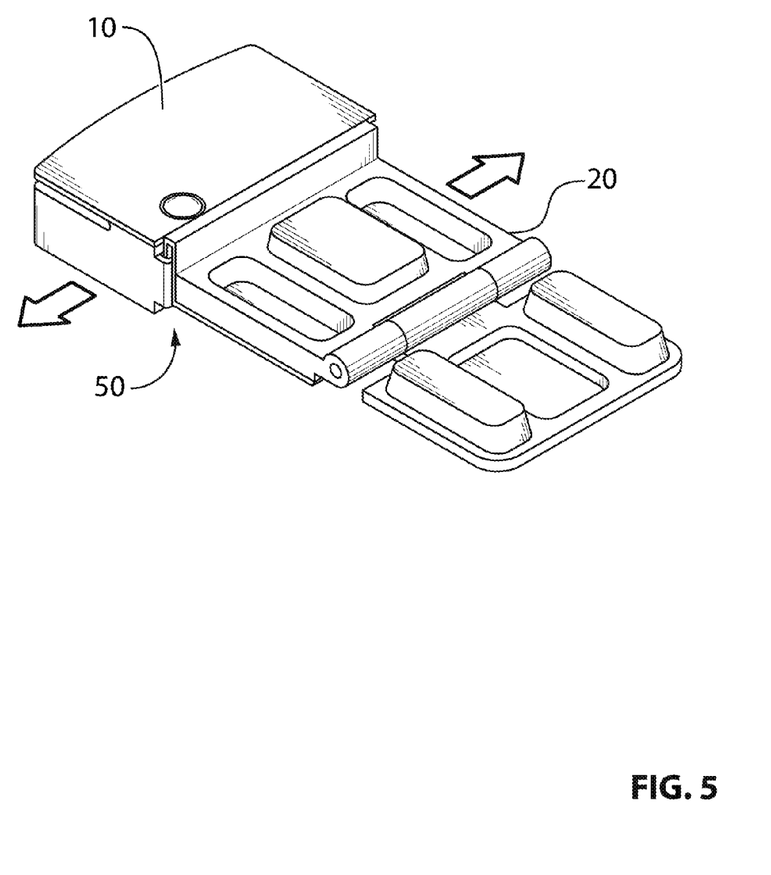
FIGS. 5 and 6 illustrate two examples of means for holding the reader module on the support device according to two particular embodiments of the invention.

For example, as illustrated in FIGS. 2a and 5, the means for holding the reader module comprise a guideway 201 (50) enabling the insertion and the withdrawal of the reader module from the support device by sliding the reader module relative to the support device.

According to this embodiment, the holding of the reader module is ensured optimally by the guideway system. At the same time, it enables the reader module to be withdrawn, for example for independent use or again when the support device has to be replaced (for example because it is damaged).

Besides, according to this first variant, the means 202 for fastening the support device to the communications terminal consist of a surface covered with adhesive gel, enabling the support device to be fixed to the back of a communications terminal, whatever its type, and enabling the support device to be withdrawn, and enabling this to be done repeatedly.

Indeed, the adhesive gel also offers the special feature of recovering its adhesive capacity after cleansing with water, for example when the device is fouled and when the adhesiveness of the gel is diminished. This therefore enables intensive and repeated constraint-free use.

It can be recalled here that the use of adhesive gel has numerous advantages, including that of enabling repeated use and that of enabling efficient fastening. In addition, its use is simple because, in order to mechanically attach the support device and the communications terminal, it is enough to press the support device to the communications terminal as would be done with a suction cap. To detach the two elements from each other, it is enough to pull the support device in the reverse sense. Indeed, the adhesive gel behaves like a multitude of small suction caps and therefore enables fastening to articles of heterogeneous shape and texture. In addition, this type of gel leaves no trace on the communications terminal once it is removed, and this enables it to be used without fear of deterioration or even of fouling the communications terminal.

It must be noted that any type of technique having the advantages of the adhesive gel described here above can be used, according to different particular embodiments of the invention, to provide the means for fastening the support device to the communications terminal.

Figure 2B:
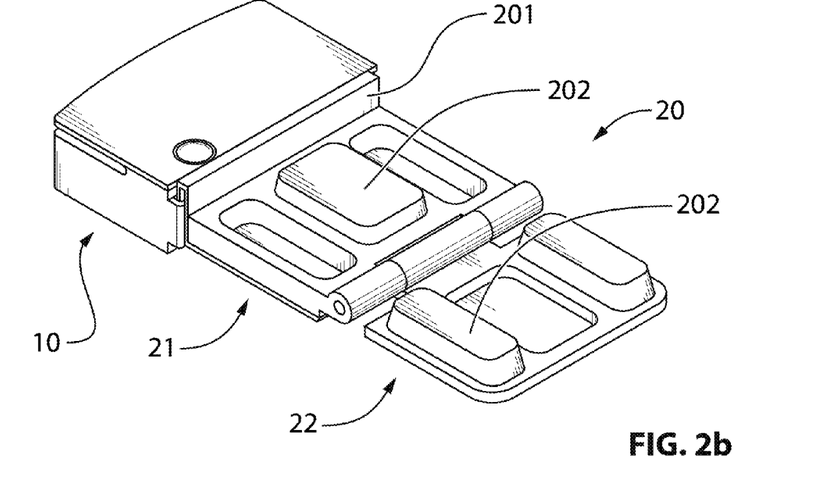

According to a second variant of this first embodiment illustrated in FIG. 2b, the support device 20 has a part forming the holding means 201 of the reader module, for example in the same form (guideway) as in the first variant described here above and a part itself formed by two hinged sub-parts 21 and 22 bearing fastening means 202 for fastening the reader module to the communications terminal.

Thus, in this second variant, the hinged parts 21 and 22 can be folded on themselves so as to close the support device (as in a powder box) for example when it is not used. In this way, the fastening means, for example in the form of adhesive gel, are not in contact with the exterior when the support device is put away, for example in a pocket, or when it is placed on a desk.

Advantageously, when each of the two parts 21 and 22 have fastening means 202 as illustrated in FIG. 2b, these fastening means 202 are disposed judiciously, for example in a staggered arrangement, so that they do not come into contact when the two parts 21 and 22 are folded, one on the other.

Besides, it is also possible to provide for slight hollows in each of the parts 21 and 22 facing the adhesive gel spots when these parts are folded, one on the other, so as to provide for a more efficient closing of the support device and a gain in space in the closed position.

This second variant therefore meets a need for putting away the support device when it is not used and does so without impairing performance, and therefore in protecting the parts covered with adhesive gel.

Figure 3A:
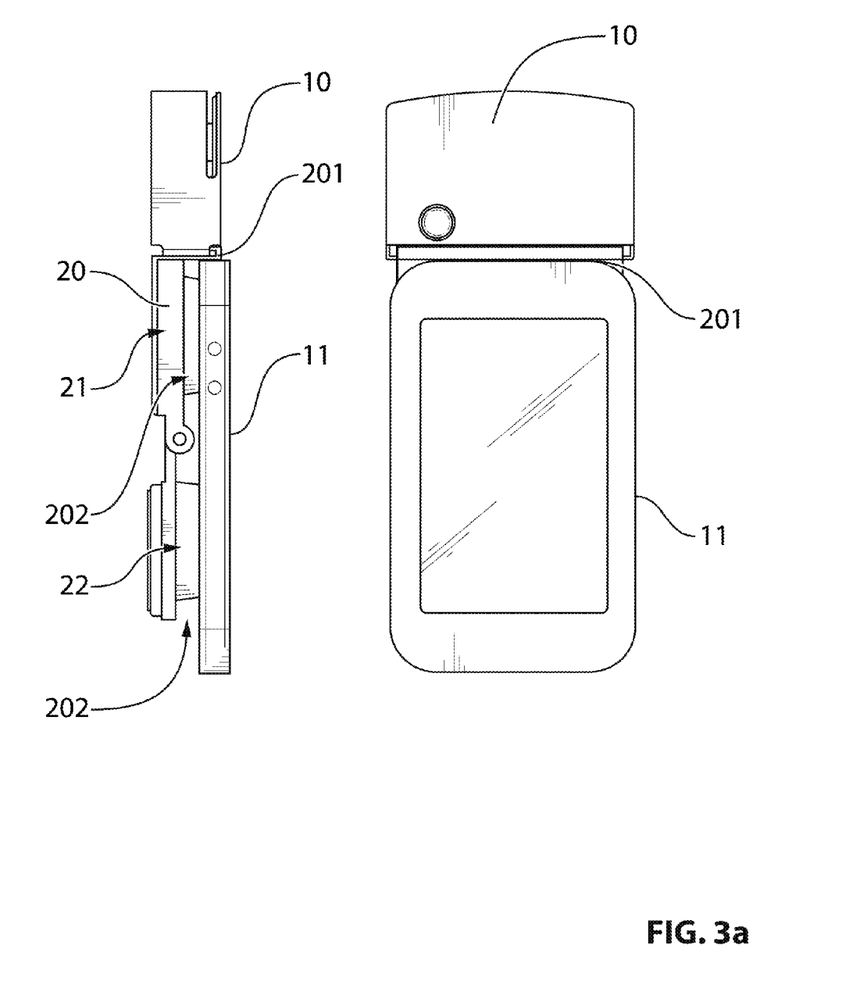
FIGS. 3*a* and 3*b* present several examples of the assembling of a reader module with a communications terminal via a support device according to the particular embodiment of the invention.

FIG. 3a for its part illustrates an assembly, via the support device in this second variant of the first embodiment of the invention, of a reader module 10 to a communications device 11 (in this case a smartphone).

The left-hand part of this FIG. 3a presents this assembly in a frontal view and it can be seen that the guideway 201, acting as means for holding the reader module 10, is positioned just on the boundary between the reader module 10 and the communications terminal 11.

On the right-hand part of this same figure, it can be seen that the two parts 21 and 22 of the support device 20 are fastened to the back of the communications terminal 11 via the different fastening means 202 so that the reader module 10 is positioned just on top of the communications terminal 11.

In this fastening position, the two parts 21 and 22 of the support device 20 are "aligned" and form a plane fastening face being fastened to the back of the communications terminal 10. It is also possible, through the hinging of the two parts 21 and 22, for them to be not at all aligned in order to adapt to the rear surface of the communications terminal, for example a tablet whose rear face is not at all plane.

Figure 3B:
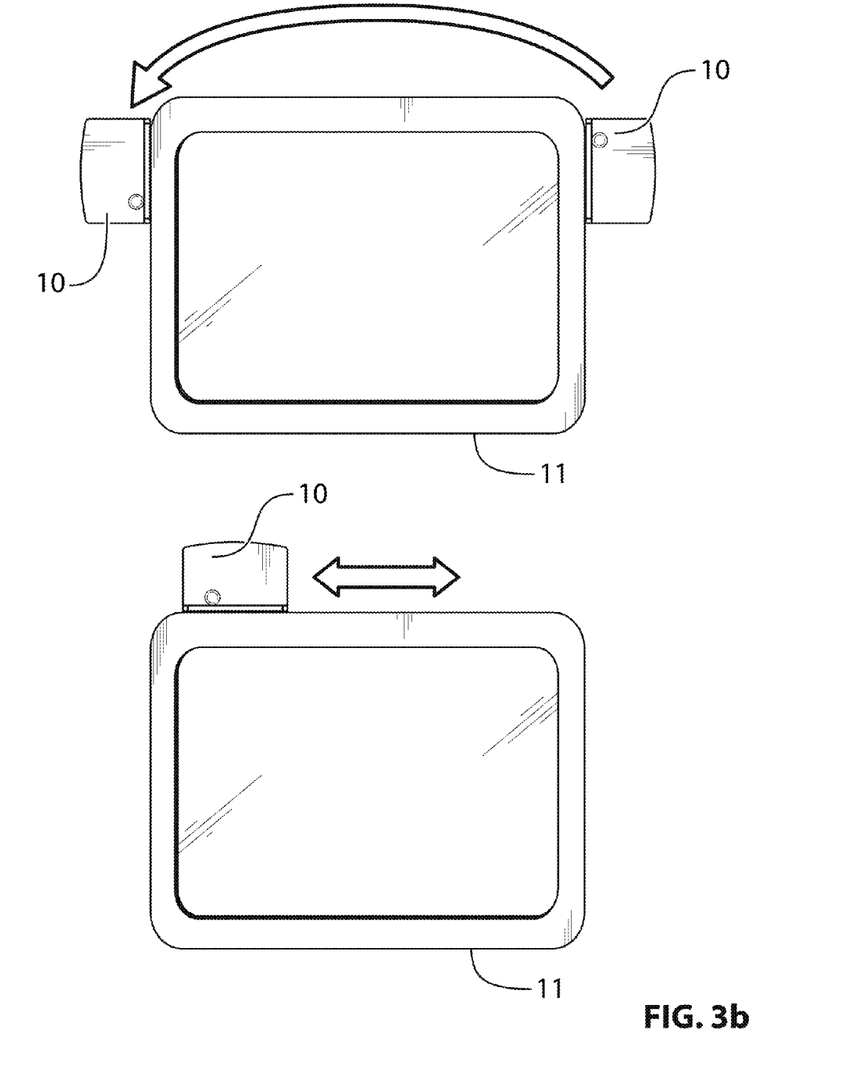

FIG. 3b illustrates several different assemblies, via the support device according to this second variant of the first embodiment of the invention, of a reader module 10 with a communications terminal 11 (in this case a tablet). It can thus be noted that the support device fixed to the back of the tablet enables the reader module 10 to be laid out on one of the sides of the tablet 11 (left-hand part of FIG. 3b) or at the top (or at the bottom not shown) of the tablet 11, at any place whatsoever.

Figure 4A:
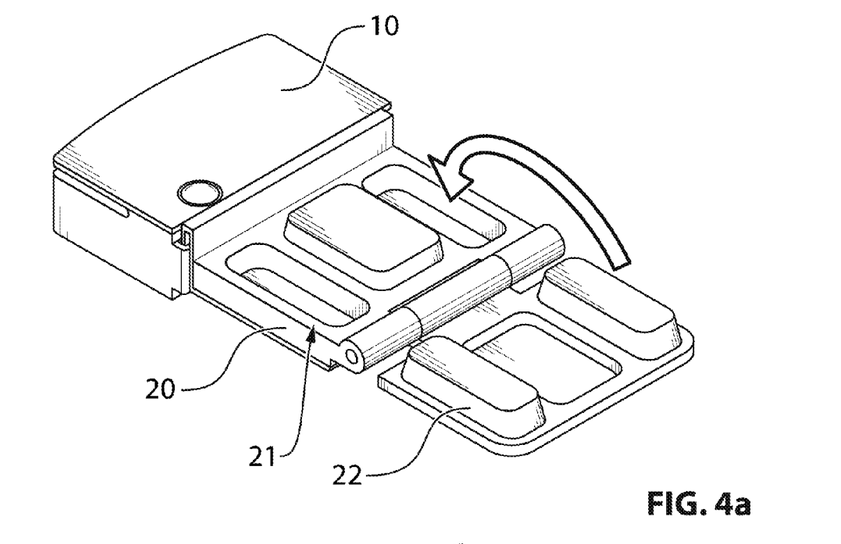
FIGS. 4*a* and 4*b* present two examples of use of the support device according to one particular embodiment of the invention.
Figure 4B:
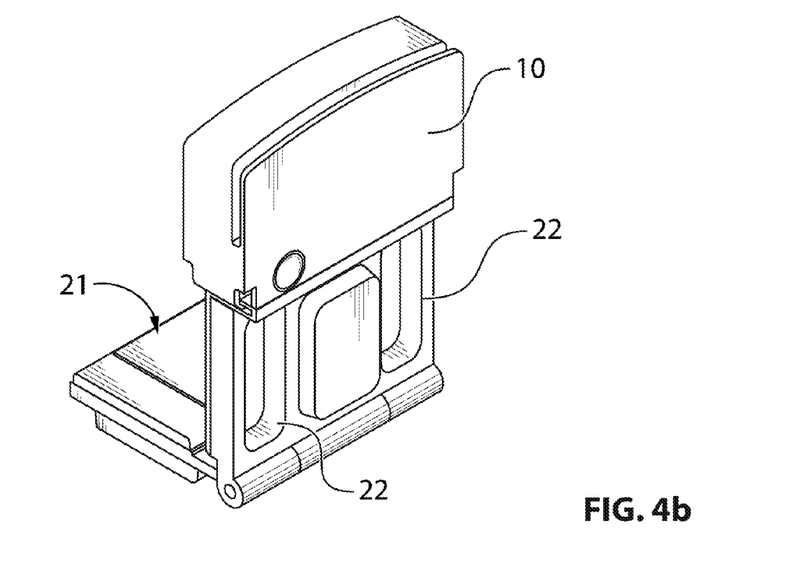

FIGS. 4a and 4b illustrate two examples of positions that can be taken by the support device when it is not used to mechanically fasten a reader module to a communications terminal.

For example, FIG. 4a illustrates the possibility of closing the support device 20, in folding the part 22 on the part 21. It will be noted that the reader module 10 can still be held by the support device 20 even in this position of non-use.

As already described here above, the parts coated with adhesive gel are judiciously placed in a staggered arrangement so as not come into contact in the closed position, and hollows are provided on each of the parts 21 and 22, facing spots of adhesive gel.

In FIG. 4b, the support device 20 is in a storage position or position of presentation of the reader module 10.

In this position indeed, the part 21 of the support device is fixed to a desk, a table, a merchant's counter, or any other support while the part 22 is folded in such a way that the reader module 10 is accessible and always held by the support device 20. This position thus makes it possible, for example, for a merchant to keep the support module within reach when it is not in use so that he can get to it quickly in order to fasten it directly to a communications terminal when he has need of it.

This position also enables a use of the reader module that can communicate by a wireless link with a communications terminal (for example the merchant's cash machine). This position of presentation allows the merchant the freedom of placing the reader module at the place which he thinks is most suitable on his counter, for example to facilitate card-reading operations.

FIG. 5 more specifically illustrates the way to withdraw the reader module 10 from the support device 20 when, as in this first embodiment, the holding means are presented in the form of a guideway 50.

It must be noted that, according to this embodiment, the reader module must be provided with means intended for insertion into this guideway.

According to another variant, not illustrated, the reader module can itself be equipped with a guideway and the support device has a specific part enabling its insertion in the guideway of the reader module.

6.3 Second Embodiment

Figure 6:
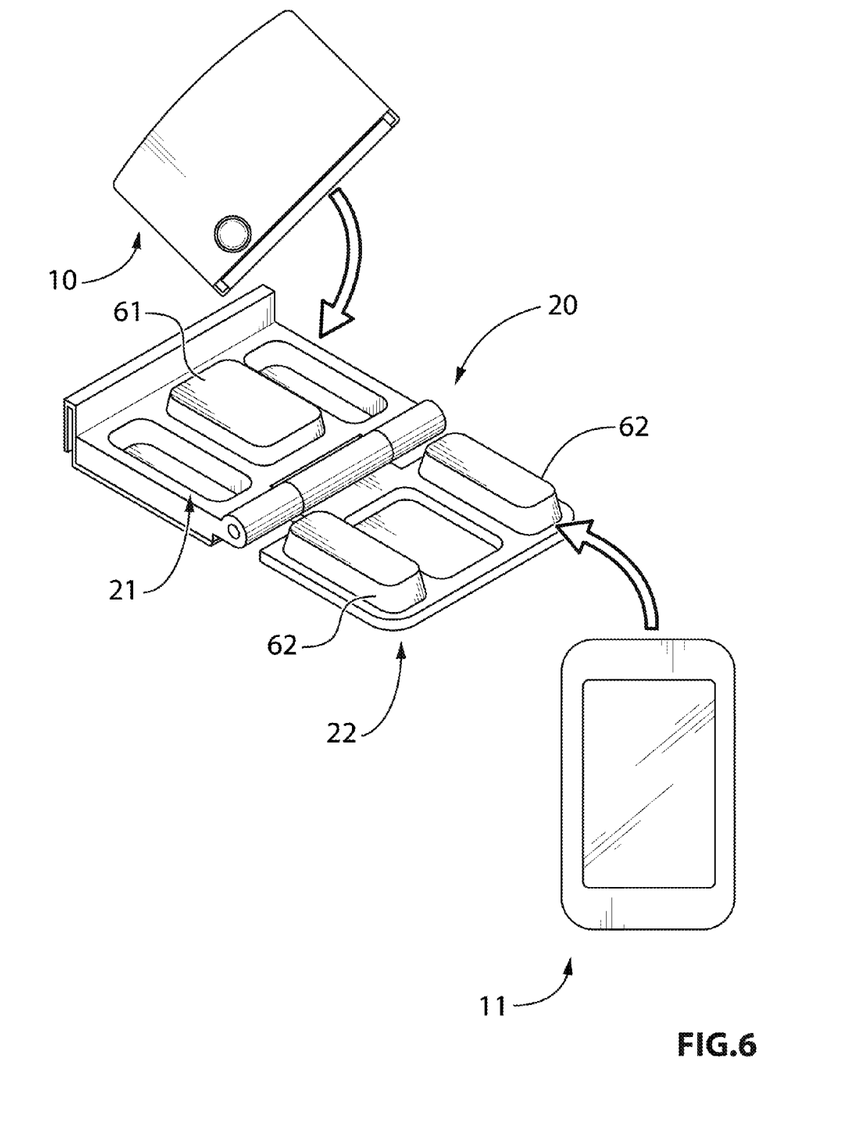

According to a second particular embodiment of the invention, illustrated in FIG. 6, the means for holding the reader module 10 and the means for fastening the support device 20 are similar means. Thus, the means for holding the reader module are also implemented by adhesive gel on one of the two hinged parts forming the reader module.

For example, a surface 61 coated with adhesive gel is provided, on the part 21, in order to receive and hold the reader module 10 while two surfaces 62 are provided, on the part 22, to fasten the support device 20 to the back of a communications terminal 11.

This second embodiment enables the use of a module that does not itself necessitate holding means, contrary to the first particular embodiment of the invention in which the reader module must be provided with means enabling its insertion in a guideway for example.

According to this second particular embodiment, it is also possible to close the support device as well as to use the support device to store the reader module in a storage position.

6.4 Communications Between the Reader Module and the Communications Terminal It must be noted that the invention, in its different particular embodiments, relates to the mechanical connection between a communications module, for example a card reader module, and a communications terminal. The connection that enables communications between these two products can be implemented in different ways.

According to a first embodiment, a wireless connection is used, for example via a Bluetooth link. Indeed, present-day communications terminals are all equipped with this mode of communication with external peripherals, such as earpieces or headsets, printers or again card reader modules. A Bluetooth wireless link is preferred to a WiFi link for this type of equipment because of its low power consumption but a WiFi link could also be used between the reader module and the terminal.

Such a wireless connection enables optimal use of the support device according to any one of the particular embodiments of the invention without any constraint of positioning of the reader module relative to the terminal because there is no constraint imposed relative to the connection equipment.

According to a second embodiment, a wire connection is used, for example of the USB type. In this case, the reader module is connected by a small cable to the USB connector of the communications terminal. This connection is all the more facilitated by the invention which enables the reader module to be positioned according to convenience on the terminal.

At least one embodiment of the present disclosure provides a technique enabling connection of a card reader module to a plurality of heterogeneous products such as smartphones of any type, tablets of any type, etc.

At least one embodiment provides a technique enabling optimal mechanical fastening of the reader module to the communications terminal.

Although the present disclosure has been described with reference to one or more examples, workers skilled in the art will recognize that changes may be made in form and detail without departing from the scope of the disclosure and/or the appended claims.

The invention claimed is:

1. A device for supporting at least one communications module, the device comprising:
   means for detachably holding, to the device for supporting, the communications module, which is configured for communications with a communications terminal;
   means for repositionably fastening said device for supporting to the communications terminal;
   wherein said device for supporting is composed of at least two hinged parts, at least one of the hinged parts having said means for fastening enabling said device for supporting to take at least the following positions:
   a fastening position in which the two hinged parts are capable of fastening the device for supporting to the communications terminal;
   a position of non-use in which the two hinged parts are folded, one on the other, detached from the communications terminal;
   a position of presentation of the communications module, in which the two hinged parts form an acute angle.

2. The device according to claim 1, wherein said means for fastening are implemented by adhesive gel on at least one portion of one face of said device for supporting.

3. The device according to claim 1, wherein that said hinged parts each have the means for fastening, which are disposed in a staggered arrangement so as not to come into contact in said position of non-use.

4. The device according to claim 1, wherein said means for holding said communications module have a guideway shape enabling insertion or withdrawal of said communications module from said device for supporting by sliding said module relative to said device for supporting.

5. The device according to claim 1, wherein said means for holding said communications module are made in the same shape as the means for fastening said device for supporting.

6. The device according to claim 1, wherein, in the position of presentation, a first of the hinged parts supports the means for holding, and a second of the hinged parts forms a generally L-shape with the first hinged part, the second hinged part comprising a first surface generally facing the communications module and a second, opposite face on which the means for fastening is positioned, which faces downward, away from the communications module.

7. A device for supporting at least one communications module, the device comprising:
   a first hinged part;
   a communications module holder on the first hinged part, which comprises either a guideway enabling insertion and withdrawal of the communications module by sliding the communications module relative to the support device or an adhesive gel enabling the communications module to be attached to and detached from the device for supporting;

a second hinged part, hindedly attached to the first hinged part;
a fastener on the second hinged part configured to repositionally fasten a communications terminal to the device for supporting, the communications module being configured for communications with the communications terminal;
a fastening position in which the first and second hinged parts are capable of fastening the device for supporting to the communications terminal;
a position of non-use in which the two hinged parts are folded, one on the other, detached from the communications terminal, and wherein the fastener on the second hinged part faces the first hinged part;
a position of presentation of the communications module, in which the first and second hinged parts for a generally L-shape, enabling the communications module to be attached to the communications module holder, and wherein second hinged part has a first surface facing generally upward toward the first hinged part and a second, opposite surface, on which the fastener is attached, facing downward away from the first hinged part.

* * * * *